United States Patent
Brendible et al.

(10) Patent No.: US 11,062,610 B1
(45) Date of Patent: Jul. 13, 2021

(54) METHODS AND SYSTEMS FOR USING PARKED VEHICLES TO NOTIFY RIDESHARE DRIVERS OF PASSENGER PICKUP LOCATIONS

(71) Applicant: Toyota Motor Engineering & Manufacturing North America, Inc., Plano, TX (US)

(72) Inventors: Aaron J. Brendible, Dexter, MI (US); Clinton Williams, Saline, MI (US); John C. Rafferty, Dexter, MI (US); Steven H. Shannir, Dearborn, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/811,852

(22) Filed: Mar. 6, 2020

(51) Int. Cl.
| G08G 1/00 | (2006.01) |
| B60Q 1/50 | (2006.01) |
| G06Q 50/30 | (2012.01) |
| H04W 4/40 | (2018.01) |
| G06Q 10/02 | (2012.01) |
| H04W 4/02 | (2018.01) |

(52) U.S. Cl.
CPC .......... *G08G 1/20* (2013.01); *B60Q 1/50* (2013.01); *G06Q 10/02* (2013.01); *G06Q 50/30* (2013.01); *H04W 4/023* (2013.01); *H04W 4/40* (2018.02)

(58) Field of Classification Search
None
See application file for complete search history.

(56) References Cited

U.S. PATENT DOCUMENTS

| 9,349,293 B2 | 5/2016 | Beaurepaire et al. |
| 2016/0171637 A1 | 6/2016 | Rai |
| 2018/0162388 A1 | 6/2018 | You et al. |

(Continued)

FOREIGN PATENT DOCUMENTS

| FR | 2803568 A1 | 7/2001 |
| KR | 101428339 B1 | 8/2014 |
| KR | 20170069645 A | 6/2017 |

(Continued)

OTHER PUBLICATIONS

Ali Aliedani, Investigating Vehicle-to-Vehicle Communication for Cooperative Car Parking: the CoPark Approach, Conference Paper: 2nd International Smart Cities Conference, Trento, Italy, Sep. 2016, 9 pages, https://www.researchgate.net/publication/307534127_Investigating_Vehicle-to-Vehicle_Communication_for_Cooperative_Car_Parking_the_CoPark_Approach.

*Primary Examiner* — Thomas S McCormack
(74) *Attorney, Agent, or Firm* — Dinsmore & Shohl LLP (57) ABSTRACT

A method for identifying a location of a rideshare requestor to a rideshare vehicle includes receiving a request to locate the rideshare requestor, determining a first location of the rideshare requestor, determining a second location of the rideshare requestor, determining whether the first location is within a threshold distance of the second location, and, in response to the first location being within the threshold distance of the second location, identifying a first immobile vehicle from one or more immobile vehicles within a preset distance from the first location, and transmitting a signal to the first immobile vehicle to cause the first immobile vehicle to indicate the first location of the rideshare requestor to the rideshare vehicle.

20 Claims, 6 Drawing Sheets

(56) References Cited

U.S. PATENT DOCUMENTS

2018/0342035 A1\* 11/2018 Sweeney ................ G08G 1/202
2019/0354114 A1\* 11/2019 Goldman ............. G05D 1/0297

FOREIGN PATENT DOCUMENTS

| WO | 2011023292 A1 | 3/2011 |
| WO | 2014192369 A1 | 12/2014 |
| WO | 2018128946 A1 | 7/2018 |

\* cited by examiner

METHODS AND SYSTEMS FOR USING PARKED VEHICLES TO NOTIFY RIDESHARE DRIVERS OF PASSENGER PICKUP LOCATIONS

TECHNICAL FIELD

The present specification relates to identifying rideshare passengers, and more particularly, to methods and systems for using parked vehicles to notify rideshare drivers of passenger pickup locations.

BACKGROUND

Ridesharing is becoming an increasingly popular mode of transportation. Ridesharing typically involves an individual (a rideshare passenger) using a smartphone app to request a ride to a particular destination. The smartphone then transmits the rideshare request along with the rideshare passenger's location to a server. Upon receiving the request, the server locates an available rideshare driver in the vicinity of the rideshare requestor and transmits the rideshare request to the rideshare driver. The rideshare driver may then accept the rideshare request and proceed to drive to the rideshare requestor's location to pick up the passenger. However, as the rideshare driver approaches the pickup location, it may not be clear exactly where the passenger is, particularly if the passenger is obstructed by parked cars or other obstructions. Furthermore, if there are several rideshare passengers in the vicinity of the pickup location, it may not be clear which passenger the driver should pick up. Accordingly, a need exists for an improved method of locating rideshare passengers at pickup locations.

SUMMARY

In one embodiment, a method for identifying a location of a rideshare requestor to a rideshare vehicle includes receiving a request to locate the rideshare requestor, determining a first location of the rideshare requestor, determining a second location of the rideshare requestor, determining whether the first location is within a threshold distance of the second location, and, in response to the first location being within the threshold distance of the second location, identifying a first immobile vehicle from one or more immobile vehicles within a preset distance from the first location, and transmitting a signal to the first immobile vehicle to cause the first immobile vehicle to indicate the first location of the rideshare requestor to the rideshare vehicle.

In another embodiment, a server includes one or more processors, one or more memory modules, and machine readable instructions stored in the one or more memory modules. When executed by the one or more processors, the machine readable instructions cause the server to receive a request to locate a rideshare requestor, determine a first location of the rideshare requestor, determine a second location of a rideshare vehicle, determine whether the first location is within a threshold distance of the second location, and, in response to the first location being within the threshold distance of the second location, identify a first immobile vehicle from one or more immobile vehicles within a preset distance from the first location, and transmit a signal to the first immobile vehicle to cause the first immobile vehicle to indicate the first location of the rideshare requestor to the rideshare vehicle.

In another embodiment, a non-transitory, computer-readable storage medium that is operable by a computer includes one or more programming instructions stored thereon. The programming instructions cause a processing device to receive a request to locate a rideshare requestor, determine a first location of the rideshare requestor, determine a second location of a rideshare vehicle, determine whether the first location is within a threshold distance of the second location, and, in response to the first location being within the threshold distance of the second location, identify a first immobile vehicle from one or more immobile vehicles within a preset distance from the first location, and transmit a signal to the first immobile vehicle to cause the first immobile vehicle to indicate the first location of the rideshare requestor to the rideshare vehicle.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for using parked vehicles to identify pickup locations for rideshare passengers. As a rideshare driver approaches a pickup location to pick up a passenger, the driver may request assistance locating the passenger. This request may be sent to a server that determines if there are any parked vehicles that are registered with the server close to the passenger. If there are any registered parked vehicles close to the passenger, the server may transmit a signal to one or more of these parked vehicles to cause the parked vehicles to identify the location of the passenger by illuminating or flashing one or more vehicle lights. When the rideshare driver sees the flashing lights of the one or more parked vehicles near the passenger, the driver will be able to easily identify the location of the passenger.

Figure 1:
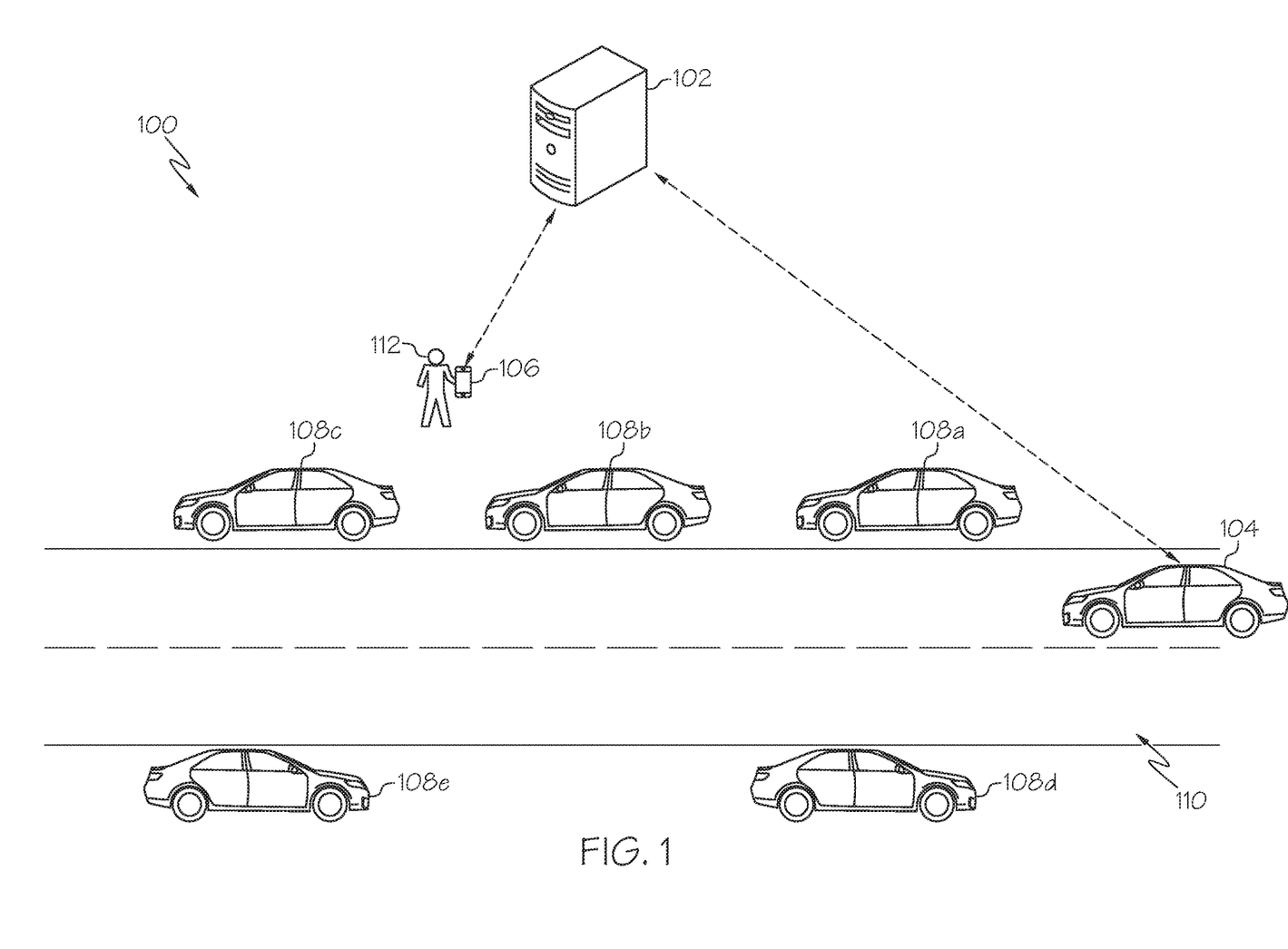
FIG. 1 schematically depicts an exemplary system for using parked vehicles to notify rideshare drivers of passenger pickup locations, according to one or more embodiments shown and described herein.

FIG. 1 schematically depicts a system 100 for using parked vehicles to notify rideshare drivers of passenger pickup locations. The system 100 includes a server 102, a rideshare vehicle 104, a mobile computing device or smartphone 106, and one or more immobile or parked vehicles 108a, 108b, 108c, 108d, 108e (collectively referred to herein as immobile vehicles 108). While five such immobile vehicles 108 are shown in the example of FIG. 1, it should be understood that any number of immobile vehicles 108 may be part of the system 100.

In some examples, the server 102 may be an edge server or road-side unit located near a road 110 along which a passenger 112 desires to be picked up by the rideshare vehicle 104. In these examples, a plurality of edge servers may be located in different locations and each edge server may communicate with another server, which may be a cloud-based server. In other examples, the server 102 may be located remotely from the road 110. In some examples, the server 102 may be a cloud-based server.

In the example of FIG. 1, the rideshare passenger or rideshare requestor 112 uses the smartphone 106 to make a rideshare request by entering a desired destination into a rideshare application software stored on the smartphone 106. The smartphone 106 then transmits the rideshare request to the server 102. The rideshare request includes the location of the passenger 112 or another location where the passenger 112 desires to be picked up (i.e., a pickup location) and the destination to which the passenger 112 desires to travel. Upon receiving the rideshare request, the server 102 uses known techniques to arrange the rideshare pickup. This comprises the server 102 locating an active rideshare vehicle (e.g., rideshare vehicle 104) in the vicinity of the pickup location and sending the details of the rideshare request to the located vehicle along with a request to accept the rideshare request.

If the driver of the rideshare vehicle 104 accepts the rideshare request, the server 102 may transmit a signal to the smartphone 106 indicating that a rideshare driver has been found. The driver of the rideshare vehicle 104 may then drive to the designated pickup location to pick up the passenger 112. As the rideshare vehicle 104 approaches the pickup location, the driver may request assistance locating the passenger 112 from the server 102. In some examples, the driver of the rideshare vehicle 104 may request this assistance using an application software on a smartphone or other mobile device. In other examples, the driver may make the request using integrated hardware of the rideshare vehicle 104. Details of the processing of the request for assistance locating the passenger 112 are described in further detail below.

In some examples, the server that arranges the rideshare between the passenger 112 and the rideshare vehicle 104 as described above is not the server 102 that provides passenger location assistance. In these examples, a separate rideshare server receives the rideshare request from the passenger 112 and locates a suitable rideshare vehicle 104. Then, when the rideshare vehicle 104 approaches the pickup location, the rideshare vehicle 104 may transmit a request to the server 102 seeking assistance in locating the passenger 112.

Figure 2:
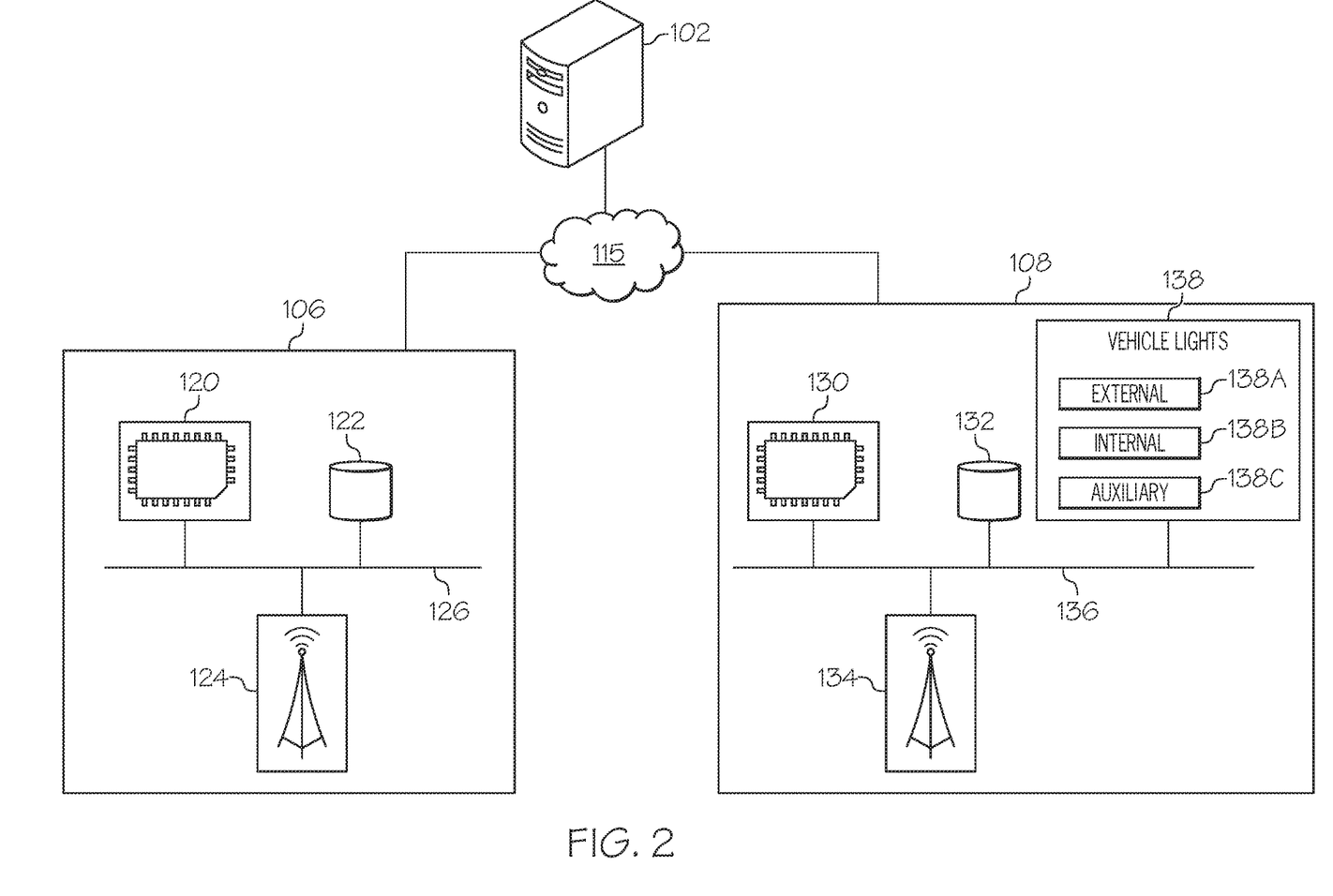
FIG. 2 depicts a schematic diagram of the server, the mobile device, and an immobile vehicle of FIG. 1, according to one or more embodiments shown and described herein.

Referring now to FIG. 2, schematic diagrams of the smartphone 106 and an immobile vehicle 108 are shown. The smartphone 106 and the immobile vehicle 108 may be communicatively coupled to the server 102. In some examples, the smartphone 106 and/or the immobile vehicle 108 may be communicatively coupled to the server 102 via a network 115.

The smartphone 106 comprises an electric control unit (ECU) 120, one or more memory modules 122, network interface hardware 124, and a communication path 126. The ECU 120 may be a controller, an integrated circuit, a microchip, a computer, or any other computing device. The one or more memory modules 122 may comprise RAM, ROM, flash memories, hard drives, or any device capable of storing data and/or machine readable and executable instructions such that the machine readable and executable instructions can be accessed by the ECU 120. The communication path 126 provides signal interconnectivity between various modules of the smartphone 106.

The network interface hardware 124 can be communicatively coupled to the communication path 208 and can be any device capable of transmitting and/or receiving data via the network 115. Accordingly, the network interface hardware 124 can include a communication transceiver for sending and/or receiving any wired or wireless communication. For example, the network interface hardware 124 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 124 includes hardware configured to operate in accordance with the Bluetooth® wireless communication protocol. The network interface hardware 124 of the smartphone 106 may transmit and receive data to and from the server 102.

The immobile vehicle 108 comprises an electric control unit (ECU) 130, one or more memory modules 132, network interface hardware 134, a communication path 136, and vehicle lights 138. The ECU 130 may be a controller, an integrated circuit, a microchip, a computer, or any other computing device. The one or more memory modules 132 may comprise RAM, ROM, flash memories, hard drives, or any device capable of storing data and/or machine readable and executable instructions such that the machine readable and executable instructions can be accessed by the ECU 130. The communication path 136 provides signal interconnectivity between various modules of the immobile vehicle 108.

The network interface hardware 134 can be communicatively coupled to the communication path 136 and can be any device capable of transmitting and/or receiving data via the network 115. Accordingly, the network interface hardware 134 can include a communication transceiver for sending and/or receiving any wired or wireless communication. For example, the network interface hardware 134 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 134 includes hardware configured to operate in accordance with the Bluetooth® wireless communication protocol. The network interface hardware 134 of the immobile vehicle 108 may transmit and receive data to and from the server 102.

Figure 6:
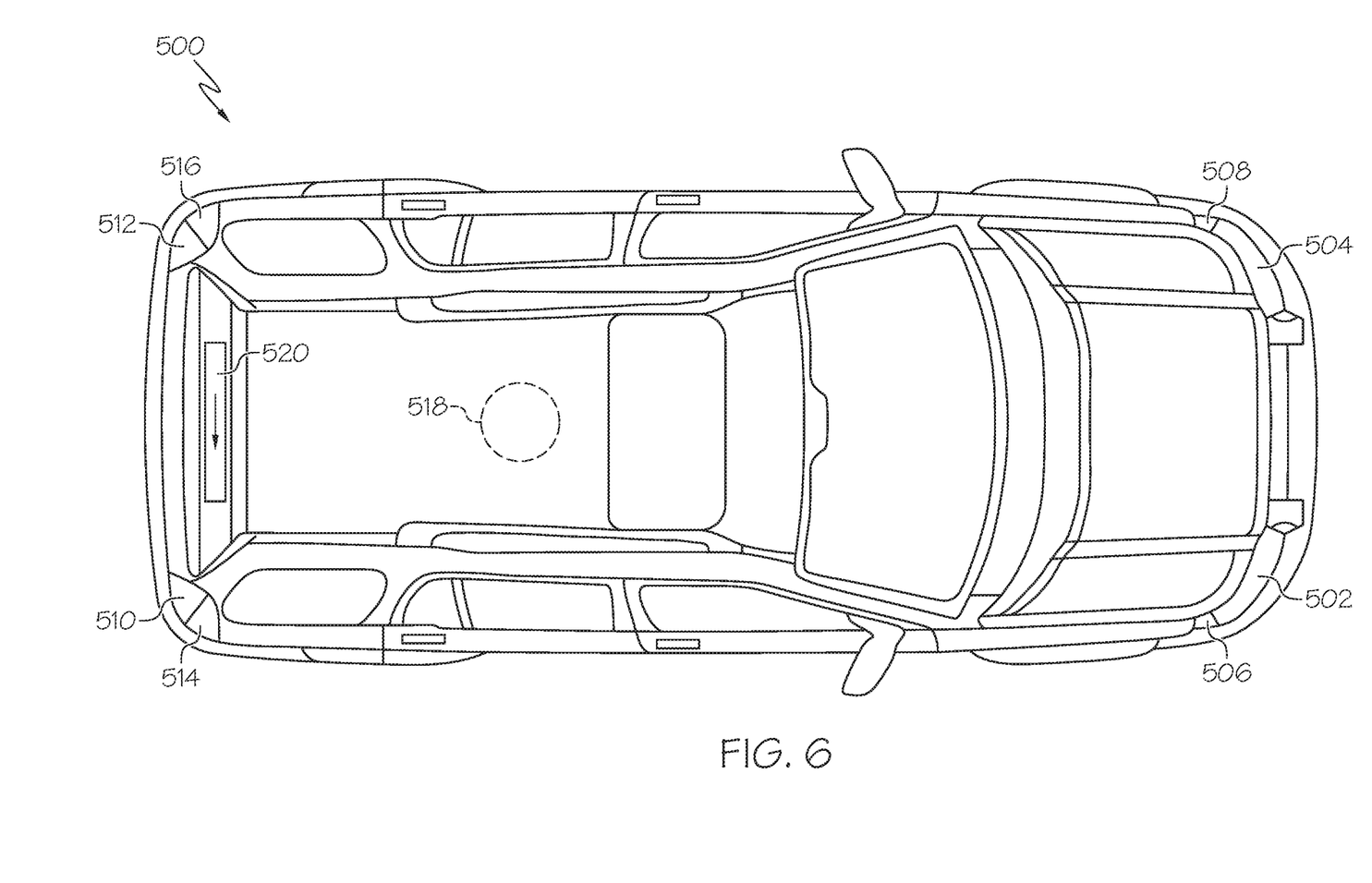
FIG. 6 depicts a top view of a parked vehicle that may be used to notify rideshare drivers of passenger pickup locations, according to one or more embodiments shown and described herein.

The vehicle lights 138 comprise external lights 138a, internal lights 138b, and auxiliary lights 138c of the vehicle 108. The vehicle lights 138 may be controlled by the ECU 130. The ECU 130 may separately control the external lights 138a, the internal lights 138b, and the auxiliary lights 138c. In some examples, the ECU 130 ma individually control each vehicle light 138 of the vehicle 108. FIG. 6 shows an exemplary vehicle 500 and a collection of lights that may comprise the vehicle lights 138. The vehicle lights 138 may be utilized to indicate the location of the rideshare passenger 112 as discussed in further detail below.

Figure 3:
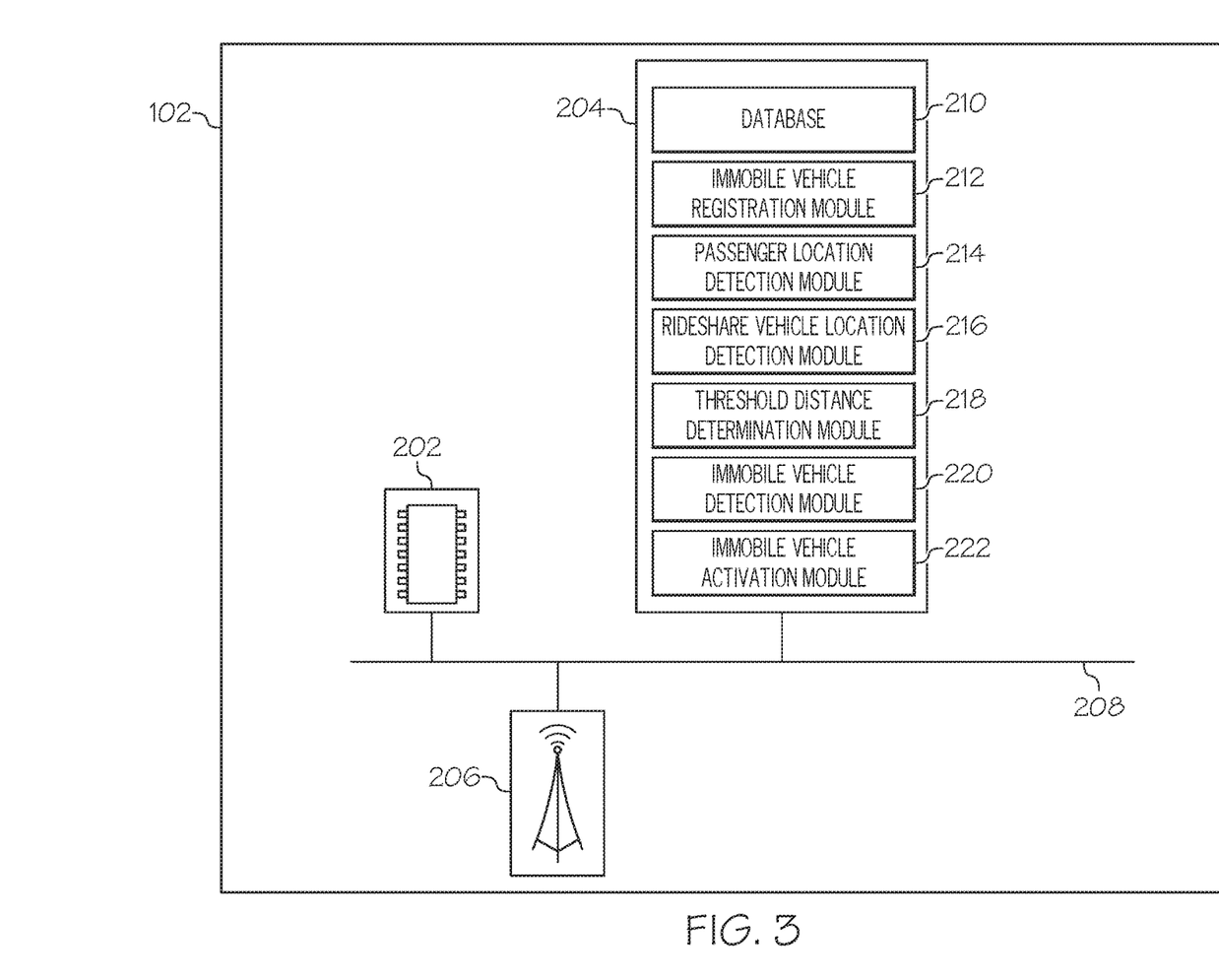
FIG. 3 depicts a schematic diagram of the server of FIG. 1, according to one or more embodiments shown and described herein.

Referring now to FIG. 3, the server 102 comprises one or more processors 202, one or more memory modules 204, network interface hardware 206, and a communication path 208. The one or more processors 202 may be a controller, an integrated circuit, a microchip, a computer, or any other computing device. The one or more memory modules 204 may comprise RAM, ROM, flash memories, hard drives, or any device capable of storing machine readable and executable instructions such that the machine readable and executable instructions can be accessed by the one or more processors 202. The communication path 208 provides signal interconnectivity between various modules of the server 102.

The network interface hardware 206 can be communicatively coupled to the communication path 208 and can be any device capable of transmitting and/or receiving data via a network. Accordingly, the network interface hardware 206 can include a communication transceiver for sending and/or receiving any wired or wireless communication. For example, the network interface hardware 206 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 206 includes hardware configured to operate in accordance with the Bluetooth® wireless communication protocol. The network interface hardware 206 of the server 102 may transmit and receive data to and from the rideshare vehicle 104, the smartphone 106, and any of the immobile vehicles 108.

The one or more memory modules 204 include a database 210, an immobile vehicle registration module 212, a passenger location detection module 214, a rideshare vehicle location detection module 216, a threshold distance determination module 218, an immobile vehicle detection module 220, and an immobile vehicle activation module 222. Each of the database 210, the immobile vehicle registration module 212, the passenger location detection module 214, the rideshare vehicle location detection module 216, the threshold distance determination module 218, the immobile vehicle detection module 220, and the immobile vehicle activation module 222 may be a program module in the form of operating systems, application program modules, and other program modules stored in one or more memory modules 204. In some embodiments, the program module may be stored in a remote storage device that may communicate with the server 102. In some embodiments, one or more of the database 210, the immobile vehicle registration module 212, the passenger location detection module 214, the rideshare vehicle location detection module 216, the threshold distance determination module 218, the immobile vehicle detection module 220, and the immobile vehicle activation module 222 may be stored in the one or more memory modules 204 of the vehicle system 200. Such a program module may include, but is not limited to, routines, subroutines, programs, objects, components, data structures and the like for performing specific tasks or executing specific data types as will be described below.

Referring still to FIG. 3, the database 210 may temporarily store data received from the rideshare vehicle 104 and/or the smartphone 106. The data received from the rideshare vehicle 104 may include a request for assistance in locating the passenger 112 along with a location of the rideshare vehicle 104. Upon receiving such a request from the rideshare vehicle 104, the server 102 may store the location of the rideshare vehicle 104 in the database 210. The data received from the smartphone 106 may include a rideshare request and a location of the smartphone 106. Upon receiving a location of the smartphone 106, the server 102 may store the location of the smartphone 106 in the database 210. The database 210 may also store registration information for the immobile vehicles 108 and locations of the registered immobile vehicles 108. Immobile vehicle registration is discussed in further detail below.

The immobile vehicle registration module 212 may receive a signal to cause the immobile vehicle registration module 212 to register a vehicle as a registered immobile vehicle. This may comprise the immobile vehicle registration module 212 receiving registration information from vehicle owners who wish to register their vehicles with the server 102 to become part of the system 100. Once a vehicle is registered with the server 102, the vehicle may be used to help rideshare drivers locate passengers. A vehicle owner who wishes to register a vehicle with the server 102 may submit a request for registration. This request may be made via a smartphone application software, a website, via mail or telephone request, or any other suitable modality.

In the illustrated example, after submitting a request for registration, the vehicle owner may be sent a hardware device that may be connected to a vehicle (e.g., immobile vehicle 108). The server 102 is able to send and receive signals from the device, which has a location tracking feature such that, after the device is connected to the vehicle 108, the server 102 is able to continually track the location of the vehicle 108. In addition, the device allows the server 102 to determine whether or not the vehicle 108 is running and allows the server 102 to control the lights 138 of the vehicle 108. In some examples, the device may allow the server 102 to control other features of the vehicle 108.

In some examples, the vehicle 108 may have an onboard computer system (e.g., the ECU 130) that the server 102 may connect to rather than utilizing separate dedicated hardware. In these examples, the onboard computer system of the vehicle 108 may allow the server 102 to track the location of the vehicle 108, determine whether the vehicle 108 is running, and control the vehicle lights 138 of the vehicle 108. As more vehicles are registered with the server 102, the server 102 will have access to more vehicles that may be utilized in responding to requests from rideshare drivers to locate passengers. Thus, it will be more likely that one or more registered immobile vehicles 108 will be near a rideshare passenger when the server 102 receives a request from a rideshare driver to locate a rideshare passenger. Accordingly, as more vehicles register with the server 102, the performance of the system 100 will improve.

Still referring to FIG. 3, the passenger location detection module 214 may determine a location of the passenger 112 waiting to be picked up by the rideshare vehicle 104. In the illustrated example, the passenger location detection module 214 accesses the location of the smartphone 106 from the database 210 to determine the location of the passenger 112. In other examples, the passenger location detection module 214 may transmit a query to the smartphone 106 requesting the location of the smartphone 106. In still other examples, the server 102 may receive a pickup location from the rideshare vehicle 104, which the passenger location detection module 214 may use as the location of the passenger 112.

The rideshare vehicle location detection module 216 may determine a location of the rideshare vehicle 104. In the illustrated example, the rideshare vehicle location detection module 216 accesses the location of the rideshare vehicle 104 from the database 210. In other examples, the rideshare vehicle location detection module 216 may transmit a query to the rideshare vehicle 104 requesting the location of the rideshare vehicle 104.

The threshold distance determination module 218 determines the distance between the location of the passenger 112, as determined by the passenger location detection module 214, and the location of the rideshare vehicle 104, as determined by the rideshare vehicle location detection module 216. The threshold distance determination module 218 then determines whether the determined distance between the passenger 112 and the rideshare vehicle 104 is within a threshold distance.

The threshold distance may be set as a distance within which the driver is likely to be close enough to see the vehicle lights 138 of an immobile vehicle 108 close to the passenger 112. For example, the threshold distance may be set as 100 feet, 200 feet, 500 feet, ¼ mile, or the like. In some examples, the threshold distance may be set by a driver of the rideshare vehicle 104. If the rideshare vehicle 104 is too far from the passenger 112 when a nearby immobile vehicle 108 illuminates its vehicle lights 138, the driver of the rideshare vehicle 104 is unlikely to see these lights. Accordingly, having the threshold distance determination module 218 determine whether the rideshare vehicle 104 is within a threshold distance of the passenger 112 allows the server 102 to not cause immobile vehicles 108 to begin illuminating their vehicle lights 138 before the driver of the rideshare vehicle 104 is likely to see them. In some examples, the threshold distance determination module 218 determines whether the rideshare vehicle 104 and the passenger 112 are on the same block (e.g., street 110 of FIG. 1) rather than within a set distance.

The immobile vehicle detection module 220 determines locations of one or more registered immobile vehicles 108 (e.g., parked vehicles) and determines whether any registered immobile vehicles 108 are within a preset distance from the location of the passenger 112. As explained above, once a vehicle is registered with the server 102, the server 102 is able to track the vehicle's location. Thus, the server 102 is able to continually monitor the locations of all registered vehicles 108 that are part of the system 100. In addition, the server 102 is able to determine whether or not each registered vehicle 108 is running at any given time. In some examples, the server 102 periodically (e.g., every minute) receives a location of each vehicle 108 that is registered with the server 102 and receives a status of each vehicle 108 (e.g., whether the vehicle's ignition is running). This data may be stored in the database 210. In other examples, the immobile vehicle detection module 220 may send a query to registered vehicles 108 requesting their location when the server 102 receives a request from the rideshare vehicle 104.

Thus, when the server 102 receives a request for assistance locating the passenger 112, the immobile vehicle detection module 220 may access the database 210 or otherwise determine the locations of registered vehicles 108 and may determine whether any registered vehicles 108 are not running (i.e., the ignition is off, meaning the vehicle is immobile) and whether any of these immobile vehicles 108 are within a preset distance of the passenger 112. If the ignition of a registered vehicle 108 is running, that vehicle 108 is not suitable to be used to identify the location of the passenger 112. This is because the vehicle 108 is likely to be moving and because it is not appropriate to control a vehicle's lights while the vehicle is being driven. Thus, the immobile vehicle detection module 220 only determines whether immobile vehicles 108 are within the preset distance from the passenger 112. These immobile vehicles 108 are likely to be parked and not in use. Accordingly, they are unlikely to move in the near future and activating their vehicle lights 138 is unlikely to cause any traffic problems.

The preset distance may be set as a distance where a registered immobile vehicle 108 is close enough to the passenger 112 that illuminating the vehicle's lights 138 will help to identify the location of the passenger 112 (e.g., adjacent to the passenger 112 or within a small radius of the passenger 112). For example, the preset distance may be set at 5 feet, or 10 feet, 20 feet, 50 feet, or the like. In some examples, the preset distance may be set by the driver of the rideshare vehicle 104. If the immobile vehicle detection module 220 determines that there is at least one registered immobile vehicle 108 within the preset distance from the passenger 112, the immobile vehicle detection module 220 may identify each such vehicle 108 and determine the distance between each identified vehicle 108 and the passenger 112. In some examples, the immobile vehicle detection module 220 also determines the orientation of each identified vehicle 108 with respect to the passenger 112 (e.g., which way is an identified vehicle facing with respect to the passenger 112) and a relative position of each identified vehicle 108 with respect to the passenger 112 (e.g., whether the vehicle is in front of or behind the passenger 112, and to the right or left of the passenger 112).

If the immobile vehicle detection module 220 determines that one or more registered immobile vehicles 108 are within the preset distance from the passenger 112, then the immobile vehicle activation module 222 may be used to cause the one or more registered immobile vehicles 108 to indicate the location of the passenger 112, as described below. In some examples, if the immobile vehicle detection module 220 determines that there are no registered immobile vehicles 108 within the preset distance from the passenger 112, then the system 100 is unable to provide assistance to the rideshare vehicle 104 in locating the passenger 112. In this case, the server 102 may transmit a message to the rideshare vehicle 104 indicating that the system 100 is unable to provide such assistance. In other examples, if the immobile vehicle detection module 220 determines that there are no registered immobile vehicles 108 within the present distance from the passenger 112, but there is a registered immobile vehicle within walking distance from the passenger 112 (e.g., within 100 feet, 200 feet, 500 feet, or the like), the server 102 may transmit a message to the smartphone 106 indicating the location of the nearest registered immobile vehicle 108 and directing the passenger 112 to the location of that vehicle. The passenger 112 may then walk to the location of the near registered immobile vehicle 108 and that vehicle may be used to indicate the location of the passenger 112, once the passenger arrives.

The immobile vehicle activation module 222 may transmit a signal to one or more registered immobile vehicles 108 near the passenger 112 to cause the vehicles 108 to identify the location of the passenger 112. In the illustrated example, the immobile vehicle activation module 222 may transmit a signal that causes one or more registered immobile vehicles 108 to illuminate one or more vehicle lights 138. The manner in which the vehicle lights 138 may be illuminated is explained in further detail below. In other examples, the immobile vehicle activation module 222 may transmit a signal that causes one or more registered immobile vehicles 108 to identify the location of the passenger 112 in another manner, such as by honking their horns.

In the illustrated example, the immobile vehicle activation module 222 causes one or more registered immobile vehicles 108 to indicate the location of the passenger 112 by illuminating one or more external lights 138a, internal lights

138*b*, or auxiliary lights 138*c*. In the example of FIG. 1, the rideshare vehicle 104 may drive down the street 100 approaching the passenger 112 at a designated pickup location. However, in the example of FIG. 1, the passenger 112 is standing behind a row of parked vehicles 108*a*, 108*b*, 108*c*, which may obstruct the driver's view of the passenger 112. Thus, the driver of the rideshare vehicle 104 may request assistance in locating the passenger 112 from the system 100.

Because the passenger 112 is standing between vehicles 108*b* and 108*c*, the immobile vehicle activation module 222 may cause vehicle lights 138 of vehicle 108*b* and/or vehicle 108*c* to illuminate or flash to indicate that the passenger 112 is close to those vehicles. When the driver of the rideshare vehicle 104 sees these vehicle lights 138 illuminate, the driver may approach the illuminated vehicle lights and pick up the passenger 112.

The immobile vehicle 108 has a number of vehicle lights 138 that can be illuminated. For example, FIG. 6 shows an exemplary immobile vehicle 500 that has right and left headlights 502, 504, right and left front turn signals 506, 508, right and left taillights 510, 512, right and left turn signals 514, 516, and an internal dome light 518. The immobile vehicle activation module 222 may cause any one or any combination of these vehicle lights 138 to illuminate to indicate a location of a passenger. Furthermore, the immobile vehicle activation module 222 may cause different lights 138 of a vehicle to illuminate depending on the position and orientation of the vehicle with respect to a passenger.

In the example of FIG. 1, the immobile vehicle activation module 222 may cause the headlights 502, 504 of the vehicle 108*b* to illuminate to indicate that the passenger 112 is located in front of the vehicle 108*b*. The immobile vehicle activation module 222 may also cause the taillights 510, 512 of the vehicle 108*c* to illuminate to indicate that the passenger 112 is located behind the vehicle 108*c*.

In another example, the immobile vehicle activation module 222 may illuminate the right headlight 502 and the right taillight 510 of the vehicles 108*b* and 108*c*, and the left headlight 504 of the vehicle 108*e* located across the street from the passenger 112. By illuminating only the lights on the right side of vehicles 108*b* and 108*c*, this may indicate to the driver of the rideshare vehicle 104 that the passenger 112 is on the right side of those vehicles. Further, by illuminating the left headlight 504 of the vehicle 108*e*, this may indicate to the driver of the rideshare vehicle 104 that the passenger 112 is across the street from that vehicle.

In some examples, the immobile vehicle activation module 222 may cause one or more vehicle lights 138 of an immobile vehicle 108 to illuminate and stay on continuously. In other examples, the immobile vehicle activation module 222 may cause one or more vehicle lights 138 of an immobile vehicle 108 to flash. Flashing lights may be easier for the driver of the rideshare vehicle 104 to see than continuously illuminating lights.

In some examples, the immobile vehicle activation module 222 may cause vehicle lights 138 of an immobile vehicle 108 to flash in a particular pattern. For example, on a street where multiple rideshare drivers are each picking up different passengers and are each utilizing the system 100 to locate those passengers, it may be difficult for a driver to determine which passenger to pick up if multiple immobile vehicles 108 are indicating locations of different passengers. Accordingly, each passenger on the street may be assigned a different pattern (e.g., a different rate of flashing or a morse code pattern). For example, a first passenger 112 may be assigned a first predetermined pattern. The first predetermined pattern may be sent to the driver of the rideshare vehicle 104 picking up the first passenger 112. Then, one or more immobile vehicles 108 near the first passenger may flash their lights 138 in the first predetermined pattern associated with the first passenger 112. As such, the driver of a rideshare vehicle 104 picking up the first passenger 112 may ignore the lights 138 of immobile vehicles 108 flashing in patterns that do not correspond to the first predetermined pattern assigned to the first passenger 112. Instead, the driver may locate the one or more immobile vehicles 108 flashing their lights 138 in the first predetermined pattern associated with that driver's passenger and drive to the vicinity of those vehicles to pick up the appropriate passenger.

In some examples, different lights of an immobile vehicle 108 may be used to create a pattern. For example, the external lights 138*a* of the vehicle 108 may flash, then the internal lights 138*b* of the vehicle 108 may flash, and then the auxiliary lights 138*c* of the vehicle may flash. Other patterns of illumination combining the external, internal, and auxiliary lights 138*a*, 138*b*, 138*c*, or combining individual lights of the vehicle 108 may be used.

In other examples, different lights 138 of immobile vehicles 108 may be used to indicate different passengers. For example, headlights 502, 504 may be used to indicate a first passenger, taillights 510, 512 may be used to indicate a second passenger, and an internal dome light 518 may be used to indicate a third passenger. The server 102 may indicate to the driver of a rideshare vehicle 104 which vehicle lights 138 are associated with that driver's passenger so that the driver can locate the correct passenger.

In some examples, an immobile vehicle 108 may have external hardware attached to the vehicle such as auxiliary lights 138*c* or an auxiliary display installed that may be used to indicate the location of a rideshare passenger. For example, FIG. 6 shows an LED display 520 positioned in the back window of the vehicle 500. In some examples, the immobile vehicle activation module 222 may transmit a signal to the immobile vehicle 108 to cause the external hardware to display a message indicating the location of the passenger 112. For example, the display 520 may display an arrow, as shown in FIG. 6, indicating the location of the passenger 112. In other examples, the display 520 may display other information such as the name of the passenger 112 or a message indicating the location of the passenger 112.

In other examples, the auxiliary lights 138*c* may illuminate in a particular color to indicate the location of the passenger 112. In some examples, different passengers may be assigned different colors to differentiate each passenger. As such, an immobile vehicle 108 may indicate the location of a passenger 112 assigned a particular color by illuminating its auxiliary lights 138*c* in the color assigned to the passenger 112.

In some examples, multiple immobile vehicles 108 may be used to indicate the location of the passenger 112. For example, in FIG. 1, vehicle 108*a* and vehicle 108*b* may both be used to indicate the location of the passenger. In one example, the immobile vehicle detection module 220 may identify the vehicle 108*a* as a first immobile vehicle within a preset distance of the passenger 112 and may identify the vehicle 108*b* as a second immobile vehicle within the present distance of the passenger 112. The immobile vehicle activation module 222 may then transmit a first signal to the first immobile vehicle 108*a* to cause the first immobile vehicle 108*a* to identify the location of the passenger to the rideshare vehicle 104 and may transmit a second signal to the second immobile vehicle 108b to cause the second immobile vehicle 108b to also indicate the location of the passenger 112 to the rideshare vehicle 104.

In some examples, the first signal transmitted to the first immobile vehicle 108a causes one or more vehicle lights 138 of the first immobile vehicle 108a to be illuminated in a first predetermined pattern based on a first distance between the first immobile vehicle 108a and the passenger 112 and the second signal transmitted to the second immobile vehicle 108b causes one or more vehicle lights 138 of the second immobile vehicle 108b to be illuminated in a second predetermined pattern based on a second distance between the second immobile vehicle 108b and the passenger 112. The first predetermined pattern may have a first predetermined rate that is proportional to the first distance and the second predetermined pattern may have a second predetermined rate that is proportional to the second distance, where the first predetermined rate is different from the second predetermined rate. For example, when the first distance between the first immobile vehicle 108a and the passenger 112 is greater than the second distance between the second immobile vehicle 108b and the passenger 112, as in the example of FIG. 1, the first predetermined rate may be greater than the second predetermined rate. Alternatively, when the second distance between the second immobile vehicle 108b and the passenger 112 is greater than the first distance between the first immobile vehicle 108a and the passenger 112, the second predetermined rate may be greater than the first predetermined rate.

In the example of FIG. 1, because the passenger 112 is close to vehicle 108b but further from vehicle 108a, the immobile vehicle activation module 222 may cause the lights 138 of vehicle 108b to flash rapidly, indicating that the passenger 112 is very close to vehicle 108b, and may cause the lights 138 of vehicle 108a to flash more slowly, indicating that the passenger 112 is further from vehicle 108b. This may allow the driver of the rideshare vehicle 104 to navigate to the location of the passenger 112. In other examples, the immobile vehicle activation module 222 may cause the lights 138 of multiple registered immobile vehicles 108 to illuminate in a particular sequence or pattern to indicate the location of the passenger 112.

In some examples, multiple immobile vehicles 108 and/or multiple lights of vehicles 108 may be illuminated in a particular sequence to identify the location of the passenger 112. For example, in the example of FIG. 1, a particular sequence may involve flashing the taillights 510, 512 of the vehicle 108a, then flashing the headlights 502, 504 of the vehicle 108a, then flashing the taillights 510, 512 of the vehicle 108b, and finally flashing the headlights 502, 504 of the vehicle 108b. This sequence may be continually repeated in quick succession. As such, the driver of the rideshare vehicle 104 may see this sequence of flashing lights leading to the location of the passenger 112. Other types of sequences of patterns involving multiple vehicles may also be used depending on the locations of the immobile vehicles 108 relative to the location of the passenger 112.

Figure 4:
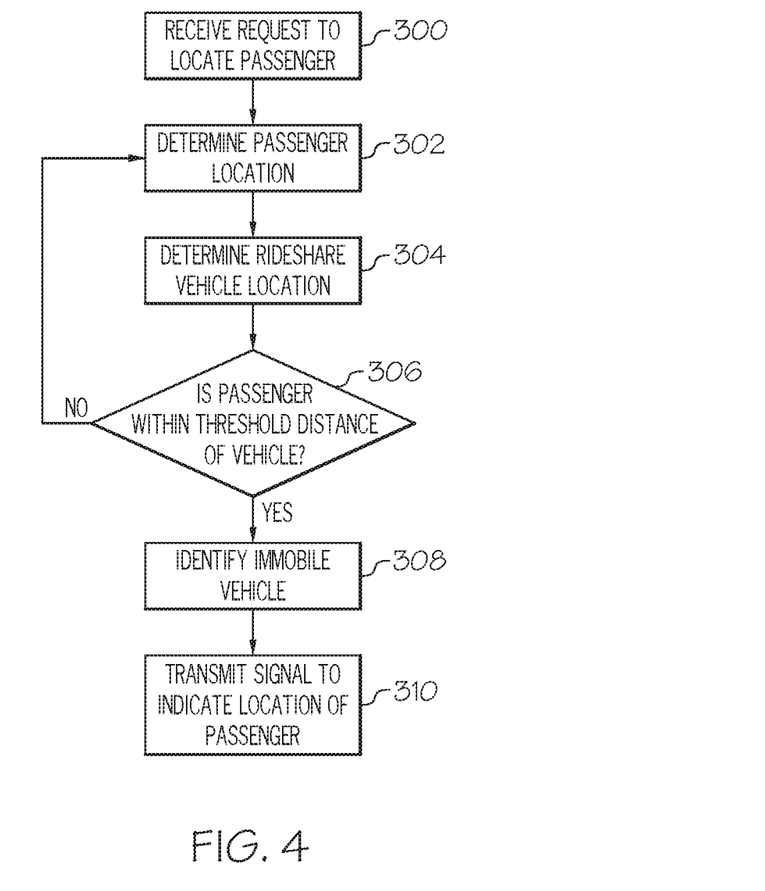
FIG. 4 depicts a flowchart for using parked vehicles to notify rideshare drivers of passenger pickup locations, according to one or more embodiments shown and described herein.

FIG. 4 depicts a flowchart for identifying a location of a rideshare requestor to a rideshare vehicle, according to one or more embodiments shown and described herein. At step 300, the server 102 receives a request from the rideshare vehicle 104 to locate the passenger 112 at a pickup location. The request may include the location of the rideshare vehicle 104. The request may also include the pickup location.

At step 302, the passenger location detection module 214 determines a first location of the passenger 112. In some examples, this involves accessing the passenger pickup location for the passenger 112 from the database 210. In other examples the passenger location detection module 214 determines the location of the passenger 112 based on a passenger pickup location received from the rideshare vehicle 104 with the request for assistance. In other examples, the passenger location detection module 214 queries the smartphone 106 to determine its location and the location of the passenger 112.

At step 304, the rideshare vehicle location detection module 216 determines a second location of the rideshare vehicle 104. This may be determined based on the request received from the rideshare vehicle 104 if the request included the rideshare vehicle's location. Alternatively, the rideshare vehicle location detection module 216 may query the rideshare vehicle 104 requesting the vehicle's location.

At step 306, the threshold distance determination module 218 determines whether the first location is within a threshold distance of the second location (i.e., whether the passenger 112 and the rideshare vehicle 104 are within a threshold distance of each other). If the first location and the second location are not within the threshold distance (i.e., the passenger 112 and the rideshare vehicle 104 are not within the threshold distance of each other) (No in step 306), control returns to step 302 and the server 102 waits until they are within the threshold distance. If the first location is within the threshold distance of the second location (i.e., the passenger 112 and the rideshare vehicle 104 are within the threshold distance of each other) (Yes in step 306), control passes to step 308.

At step 308, the immobile vehicle detection module 220 identifies a first immobile vehicle from the one or more immobile vehicles 108 within a preset distance from the first location (i.e., the location of the passenger 112). This may involve accessing the locations and vehicle status (e.g., whether a vehicle is running) of the vehicles 108 registered with the server 102 from the database 210. In some examples, the first immobile vehicle is identified as a vehicle from the one or more immobile vehicles 108 that is closest to the passenger 112 based on the first location of the passenger 112 and the locations of the one or more immobile vehicles 108.

At step 310, the immobile vehicle activation module 222 transmits a signal to the first immobile vehicle to cause the first immobile vehicle to indicate the location of the passenger 112 to the rideshare vehicle 104. This signal may cause one or more of the external lights 138a, internal lights 138b, or auxiliary lights 138c of the first immobile vehicle be illuminated to indicate the first location of the passenger 112 to the rideshare vehicle 104.

Figure 5:
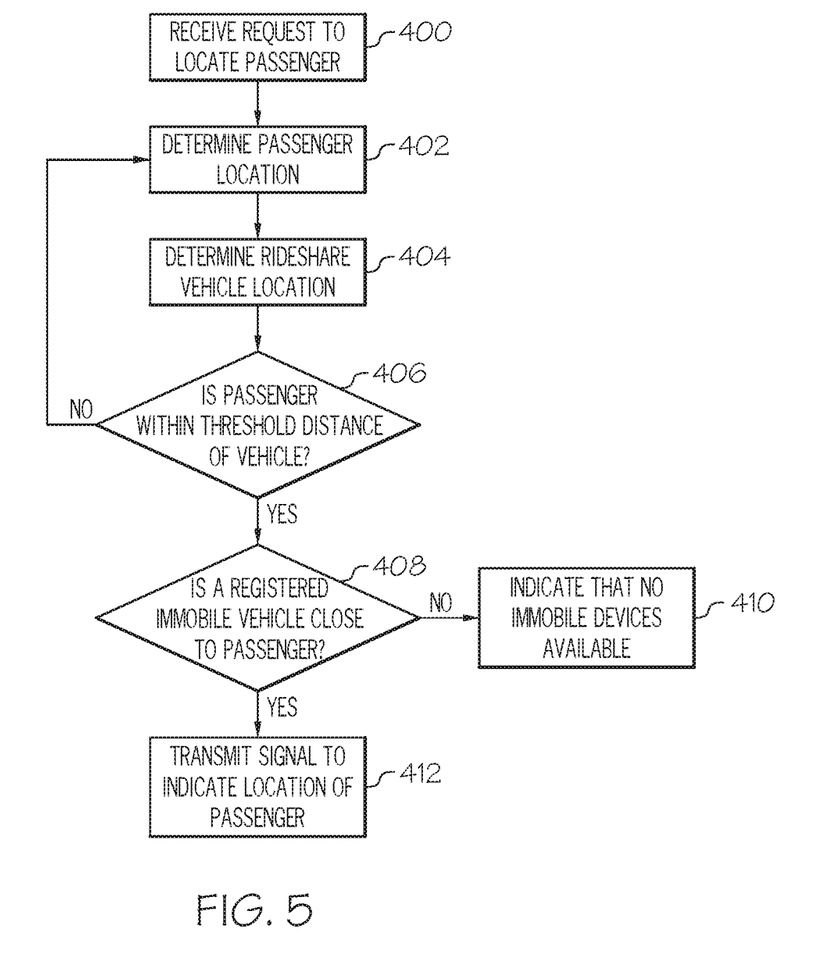
FIG. 5 depicts another flowchart for exemplary system for using parked vehicles to notify rideshare drivers of passenger pickup locations, according to one or more embodiments shown and described herein.

FIG. 5 depicts another flowchart for using parked vehicles 108 to notify rideshare drivers of passenger pickup locations, according to one or more embodiments shown and described herein. At step 400, the server 102 receives a request from the rideshare vehicle 104 for assistance in locating the passenger 112 at a pickup location. The request may include the location of the rideshare vehicle 104 and a pickup location.

At step 402, the passenger location detection module 214 determines the location of the passenger 112. At step 404, the rideshare vehicle location detection module 216 determines the location of the rideshare vehicle 104. At step 406, the threshold distance determination module 218 determines whether the passenger 112 and the rideshare vehicle 104 are within a threshold distance of each other. If the passenger 112 and the rideshare vehicle 104 are not within the threshold distance of each other (No in step 406), control returns to step 402 and the server 102 waits until they are within the threshold distance. If the passenger 112 and the rideshare vehicle 104 are within the threshold distance of each other (Yes in step 406), control passes to step 408.

At step 408, the immobile vehicle detection module 220 determines whether at least one registered immobile vehicle 108 is within a second threshold distance from the passenger 112. If there is not at least one registered immobile vehicle 108 within the second threshold distance of the passenger 112 (No in step 408), then control passes to step 410 and the server 102 transmits a message to the rideshare vehicle 104 indicating that there are no registered immobile vehicles 108 available to indicate the first location of the passenger 112 to the rideshare vehicle 104. If at least one registered immobile vehicle 108 is within the second threshold distance of the passenger 112 (Yes in step 410), then control passes to step 412. At step 412, the immobile vehicle detection module 220 identifies the at least one registered immobile vehicle 108 and the immobile vehicle activation module 222 transmits a signal to the at least one registered immobile vehicle 108 to cause the at least one registered immobile vehicle 108 to indicate the location of the passenger 112 to the rideshare vehicle 104.

It should be understood that embodiments described herein are directed to systems and methods for using parked vehicles to identify pickup locations for rideshare passengers. The system registers vehicles to become part of the system and then tracks the locations and running status of those vehicles. When the system receives a request for assistance in locating a passenger at a pickup location, the system determines whether there are any registered immobile vehicles close to the passenger. Then, when the rideshare vehicle approaches the passenger, the system causes one or more vehicle lights of registered immobile vehicles close to the passenger to illuminate in order to show the driver of the rideshare vehicle the location of the passenger.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for identifying a location of a rideshare requestor to a rideshare vehicle, the method comprising:
   receiving a request to locate the rideshare requestor;
   determining a first location of the rideshare requestor;
   determining a second location of the rideshare vehicle;
   determining whether the first location is within a threshold distance of the second location; and
   in response to the first location being within the threshold distance of the second location:
      identifying a first immobile vehicle from one or more immobile vehicles within a preset distance from the first location; and
      transmitting a signal to the first immobile vehicle to cause the first immobile vehicle to indicate the first location of the rideshare requestor to the rideshare vehicle.

2. The method of claim 1, wherein the signal transmitted to the first immobile vehicle causes one or more internal, external, or auxiliary vehicle lights of the first immobile vehicle to be illuminated to indicated the first location of the rideshare requestor to the rideshare vehicle.

3. The method of claim 2, wherein the signal transmitted to the first immobile vehicle causes the one or more vehicle lights of the first immobile vehicle to be illuminated in a first predetermined pattern.

4. The method of claim 1, wherein the first immobile vehicle is identified as a vehicle from the one or more immobile vehicles that is closest to the rideshare requestor based on the first location of the rideshare requestor and locations of the one or more immobile vehicles.

5. The method of claim 1, further comprising, in response to the first location being within the threshold distance of the second location:
   identifying a second immobile vehicle from the one or more immobile vehicles; and
   transmitting a second signal to the second immobile vehicle to cause the second immobile vehicle to indicate the first location of the rideshare requestor to the rideshare vehicle.

6. The method of claim 5, wherein the signal transmitted to the first immobile vehicle causes one or more vehicle lights of the first immobile vehicle to be illuminated in a first predetermined pattern based on a first distance between the first immobile vehicle and the rideshare requestor, and the second signal transmitted to the second immobile vehicle causes one or more vehicle lights of the second immobile vehicle to be illuminated in a second predetermined pattern based on a second distance between the second immobile vehicle and the rideshare requestor.

7. The method of claim 6, wherein the first predetermined pattern has a first predetermined rate that is proportional to the first distance and the second predetermined pattern has a second predetermined rate that is proportional to the second distance, the first predetermined rate is different from the second predetermined rate.

8. The method of claim 7, wherein:
   when the first distance is greater than the second distance, the first predetermined rate is greater than the second predetermined rate; and
   when the second distance is greater than the first distance, the second predetermined rate is greater than the first predetermined rate.

9. The method of claim 1, wherein the signal transmitted to the first immobile vehicle causes external hardware connected to the first immobile vehicle to indicate the location of the rideshare requestor to the rideshare vehicle.

10. The method of claim 9, wherein the signal transmitted to the first immobile vehicle causes the external hardware to display a message indicating the location of the rideshare requester.

11. The method of claim 1, further comprising, in response to the first location being within the threshold distance of the second location:
   determining whether at least one registered immobile vehicle is within a second threshold distance of the rideshare requestor; and
   in response to at least one registered immobile vehicle being within the second threshold distance of the rideshare requestor:

identifying the at least one registered immobile vehicle as the first immobile vehicle; and transmitting the signal to the at least one registered immobile vehicle to cause the at least one registered immobile vehicle to indicate the first location of the rideshare requestor to the rideshare vehicle.

12. The method of claim 1, further comprising, in response to the first location being within the threshold distance of the second location:

determining whether at least one registered immobile vehicle is within a second threshold distance of the rideshare requestor; and in response to at least one registered immobile vehicle not being within the second threshold distance of the rideshare requestor, transmitting a signal to the rideshare vehicle indicating that there are no registered immobile vehicles available to indicate the first location of the rideshare requestor to the rideshare vehicle.

13. A server comprising:

one or more processors;

one or more memory modules; and machine readable instructions stored in the one or more memory modules that, when executed by the one or more processors, cause the server to:

receive a request to locate a rideshare requestor;

determine a first location of the rideshare requestor;

determine a second location of a rideshare vehicle;

determine whether the first location is within a threshold distance of the second location; and in response to the first location being within the threshold distance of the second location:

identify a first immobile vehicle from one or more immobile vehicles within a preset distance from the first location; and transmit a signal to the first immobile vehicle to cause the first immobile vehicle to indicate the first location of the rideshare requestor to the rideshare vehicle.

14. The server of claim 13, wherein the machine readable instructions stored in the one or more memory modules, when executed by the one or more processors, cause the server to:

identify a second immobile vehicle from the one or more immobile vehicles; and transmit a second signal to the second immobile vehicle to cause the second immobile vehicle to indicate the first location of the rideshare requestor to the rideshare vehicle.

15. The server of claim 13, wherein the machine readable instructions stored in the one or more memory modules, when executed by the one or more processors, cause the server to:

determine whether at least one registered immobile vehicle is within a second threshold distance of the rideshare requestor; and in response to the at least one registered immobile vehicle being within the second threshold distance of the rideshare requestor:

identify the at least one registered immobile vehicle as the first immobile vehicle; and transmit the signal to the at least one registered immobile vehicle to cause the at least one registered immobile vehicle to indicate the first location of the rideshare requestor to the rideshare vehicle.

16. The server of claim 13, wherein the machine readable instructions stored in the one or more memory modules, when executed by the one or more processors, cause the server to:

determine whether at least one registered immobile vehicle is within a second threshold distance of the rideshare requestor; and in response to at least one registered immobile vehicle not being within the second threshold distance of the rideshare requestor, transmit a signal to the rideshare vehicle indicating that there are no registered immobile vehicles available to indicate the first location of the rideshare requestor to the rideshare vehicle.

17. The server of claim 13, wherein the machine readable instructions stored in the one or more memory modules, when executed by the one or more processors, cause the server to receive a signal to register a vehicle as a registered immobile vehicle.

18. A non-transitory, computer-readable storage medium that is operable by a computer, the non-transitory, computer-readable medium comprising one or more programming instructions stored thereon for causing a processing device to:

receive a request to locate a rideshare requestor;

determine a first location of the rideshare requestor;

determine a second location of a rideshare vehicle;

determine whether the first location is within a threshold distance of the second location; and in response to the first location being within the threshold distance of the second location:

identify a first immobile vehicle from one or more immobile vehicles within a preset distance from the first location; and transmit a signal to the first immobile vehicle to cause the first immobile vehicle to indicate the first location of the rideshare requestor to the rideshare vehicle.

19. The non-transitory, computer-readable storage medium of claim 18, wherein the programming instructions cause the processing device to:

identify a second immobile vehicle from the one or more immobile vehicles; and transmit a second signal to the second immobile vehicle to cause the second immobile vehicle to indicate the first location of the rideshare requestor to the rideshare vehicle.

20. The non-transitory, computer-readable storage medium of claim 18, wherein the programming instructions cause the processing device to:

determine whether at least one registered immobile vehicle is within a second threshold distance of the rideshare requestor; and in response to the at least one registered immobile vehicle being within the second threshold distance of the rideshare requestor:

identify the at least one registered immobile vehicle as the first immobile vehicle; and transmit the signal to the at least one registered immobile vehicle to cause the at least one registered immobile vehicle to indicate the first location of the rideshare requestor to the rideshare vehicle.

* * * * *